Aug. 2, 1966   E. C. ANDERSON   3,263,651
METHOD OF CATTLE FEEDING
Filed Dec. 7, 1964
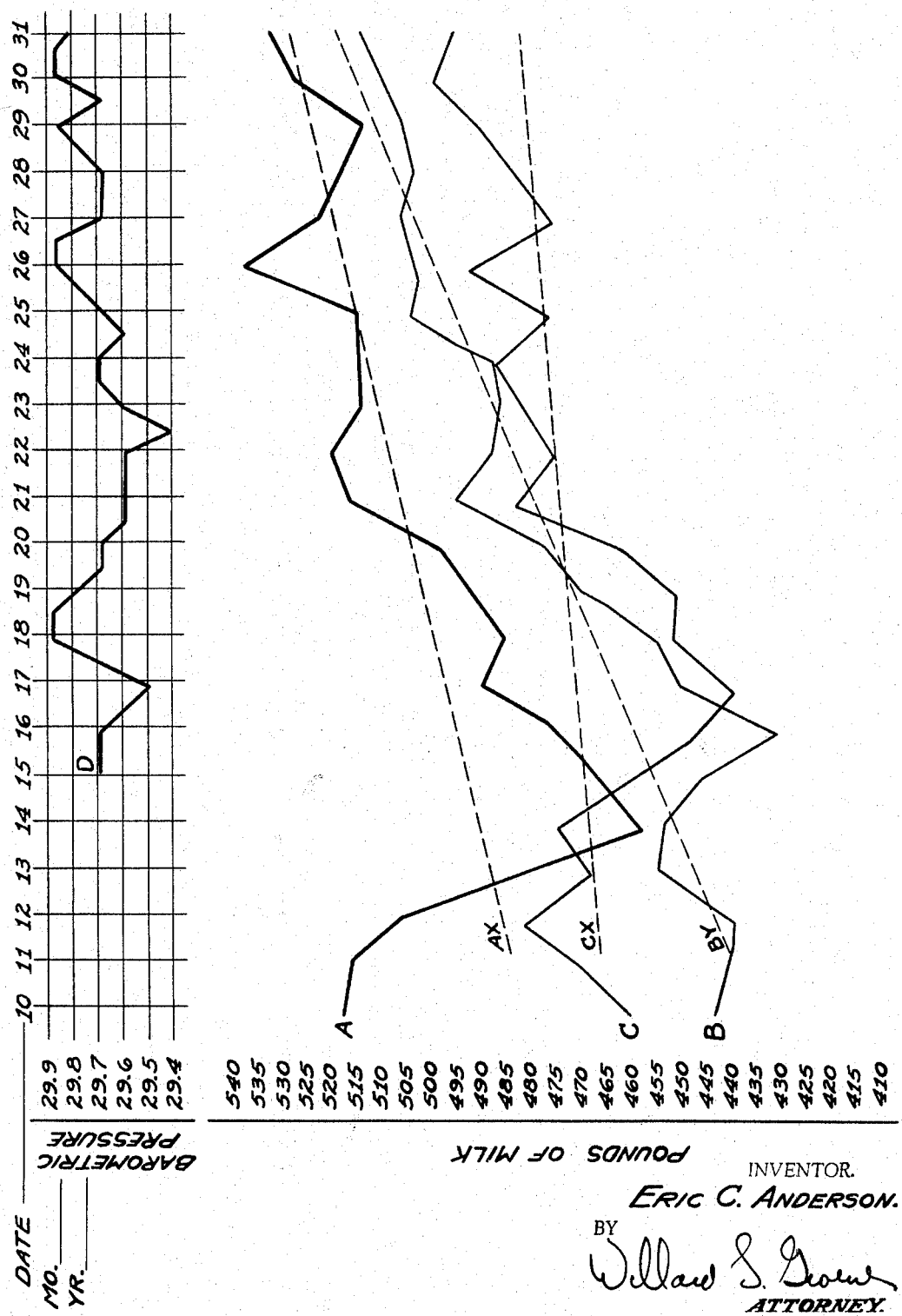
INVENTOR.
*Eric C. Anderson.*
BY
*Willard S. Grow*
ATTORNEY.

__3,263,651__
__METHOD OF CATTLE FEEDING__
Eric C. Anderson, 304 W. Cleveland, Bozeman, Mont.
Filed Dec. 7, 1964, Ser. No. 416,463
2 Claims. (Cl. 119—51)

This invention pertains to a method of feeding proteins and concentrates to cattle in accordance to barometric pressure to stabilize and increase the production of cattle either by weight or milk production.

One of the objects of this invention is to utilize atmospheric barometric pressure for stabilizing milk production.

Another object is to provide advantages to the milk producer by the stabilization of milk production based on barometric pressure.

It is also an object to utilize a correction factor based on barometric pressure variations which is applied to all activities pertaining to milk production.

Still another object is to provide a correlation coefficient between barometric pressure and milk production of cattle.

Further features and advantages of this invention will appear from a detailed description of the drawings in which:

The drawing is a graph showing barometric pressure and pounds of milk production.

In conducting the method of this invention, the mean barometric pressure for a particular area for a particular time interval is obtained from the United States Weather Bureau. This mean barometric pressure is utilized as the basis of the feeding calculations for the particular period of time under consideration.

The amount of total digestive nutrients needed to accomplish the goal set is obtained from Morrison's Feeds and Feeding or publications from the National Research Council.

It has been found that on days when the barometric pressure and the mean barometric pressure are the same, this is the amount of total digestible nutrients that is supplied. For each tenth of an inch raise in barometric pressure the protein or concentrate is increased 20%. For each tenth of an inch decrease in barometric pressure the protein or concentrate is decreased 20%.

A pilot study showed a correlation coefficient of 96.3 between barometric pressure and milk production and indicated production can be stabilized by nutrition and thereby extend the peak or optimum of production of a dairy cow.

Further study showed that a correction factor for barometric pressure does exist and this factor is of enough significance that previous production experiments, which have not allowed for this, are invalid.

The milking records of the dairy herd at Montana State College for the month of October 1963 were observed. The dairy milk records for thirty-seven cows were totaled for thirty-one days. This gave a total of 2294 observations. The total milk production of the thirty-seven cows was recorded and also the barometric pressure for that day. These cows gave approximately 1450 pounds of milk per day. The results were that a 2% change in barometric pressure gave a 5% change in milk production. The correlation coefficient was 96.3.

A study was made during the month of May 1964. The results of this showed that milk production could be stabilized and milk production increased on the same amount of feed that was fed the control group. This second study was performed along the lines proposed above. The purpose of this was to see if production could be stabilized, to see if production could be increased by use of barometric pressure, and to determine what problems migh occur on a more scientifically performed project.

The graph of the drawing shows in solid line A the results of a control group, the broken line AX showing the trend of this group.

The solid line B shows the group having been fed concentrates added during high barometric pressure and subtracted during low barometric pressure conditions, the broken line BY showing the trend of this group.

The solid line C shows the group having been fed concentrates subtracted during high barometric pressure and added during low barometric pressure conditions, the broken line CX showing the trend of this group.

The full line D at the top of the chart shows the mean daily barometric pressure during the test examples A, B and C.

While the method and procedures herein disclosed and described constitutes a preferred form of the invention, it is also to be understood that the method is capable of alteration without departing from the spirit of the invention and that such adaptation as fall within the scope of the appendant claims are intended to be included herein.

What is claimed is:

1. A method of feeding proteins and concentrates according to the barometric pressure for the purpose of stabilizing and increasing the production of cattle by weight and milk production by increasing the portions of said proteins and concentrate fed said cattle with the increase of barometric pressure and decreasing the proteins and concentrate fed said cattle with decrease in barometric pressure.

2. A method of feeding proteins and concentrates to cattle comprising the steps of:
 (A) determining the means of barometric pressure for a particular area for a particular time interval for approximately one month,
 (B) utilizing the thus obtained mean barometric pressure as the basis of all feeding calculations for this period of time,
 (C) utilizing authoritative publications to determine the optimum amount of total digestive nutrients required to be fed to accomplish the goal set,
 (D) for each tenth of a point raise in the barometric pressure increase the optimum amount of protein and concentrates fed to the cattle by twenty percent,
 (E) and for each tenth of a point decrease in barometric pressure decrease the optimum amount of protein and concentrates fed to the cattle by twenty percent.

__References Cited by the Examiner__
UNITED STATES PATENTS
3,168,888    2/1965    Broderick _____ 119—51

SAMUEL KOREN, *Primary Examiner.*
ALDRICH F. MEDBERRY, *Examiner.*